Aug. 13, 1957 W. L. PRINGLE 2,802,554
VEHICLE DRIVE MECHANISM
Filed Dec. 30, 1953 3 Sheets-Sheet 1
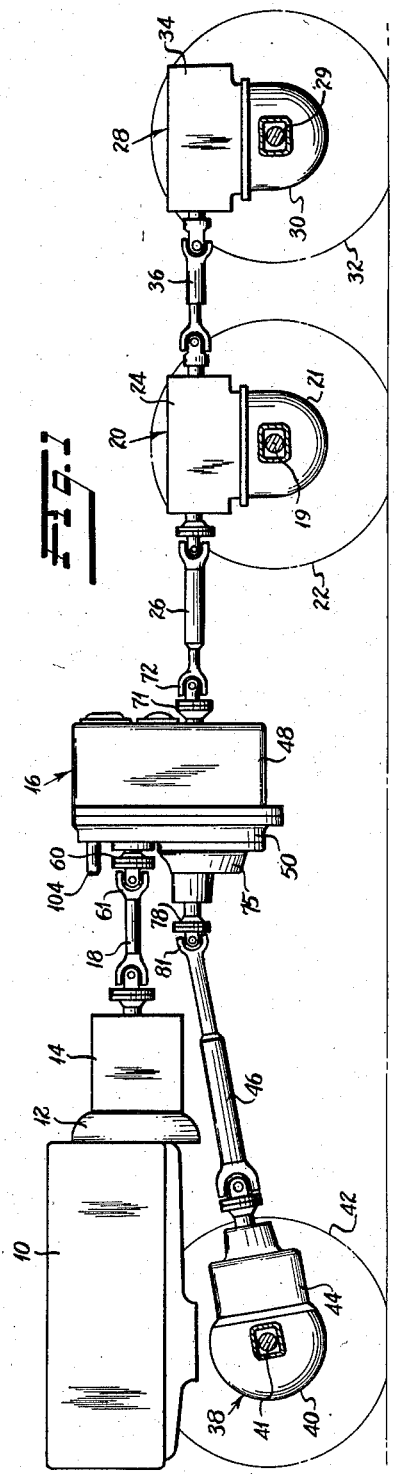
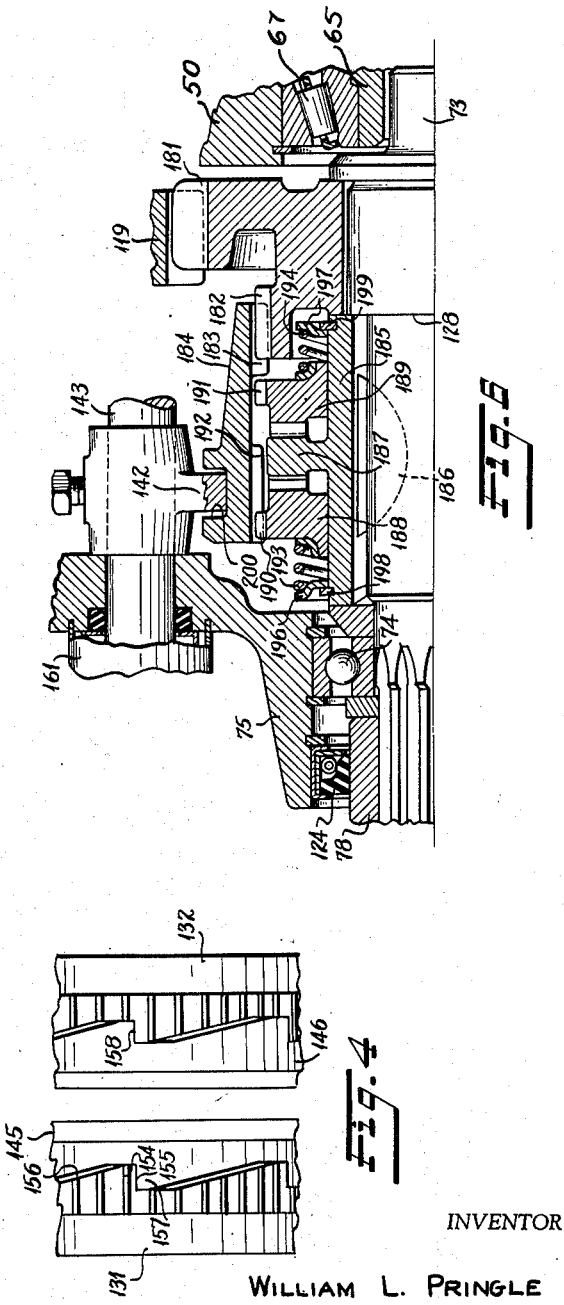
INVENTOR
WILLIAM L. PRINGLE
BY *Strauch, Nolan + Diggins*
ATTORNEYS

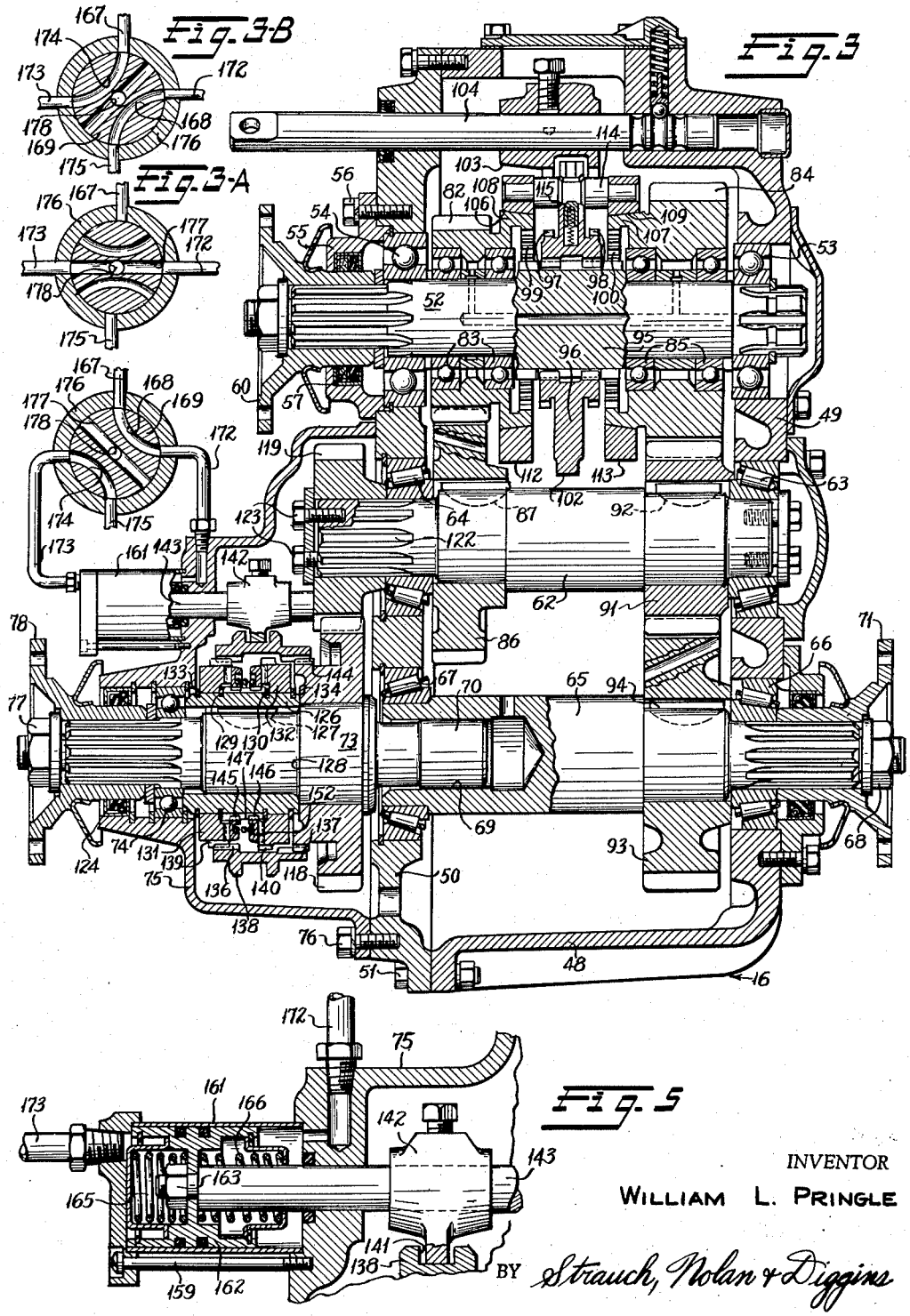

Aug. 13, 1957 W. L. PRINGLE 2,802,554
VEHICLE DRIVE MECHANISM
Filed Dec. 30, 1953 3 Sheets-Sheet 3
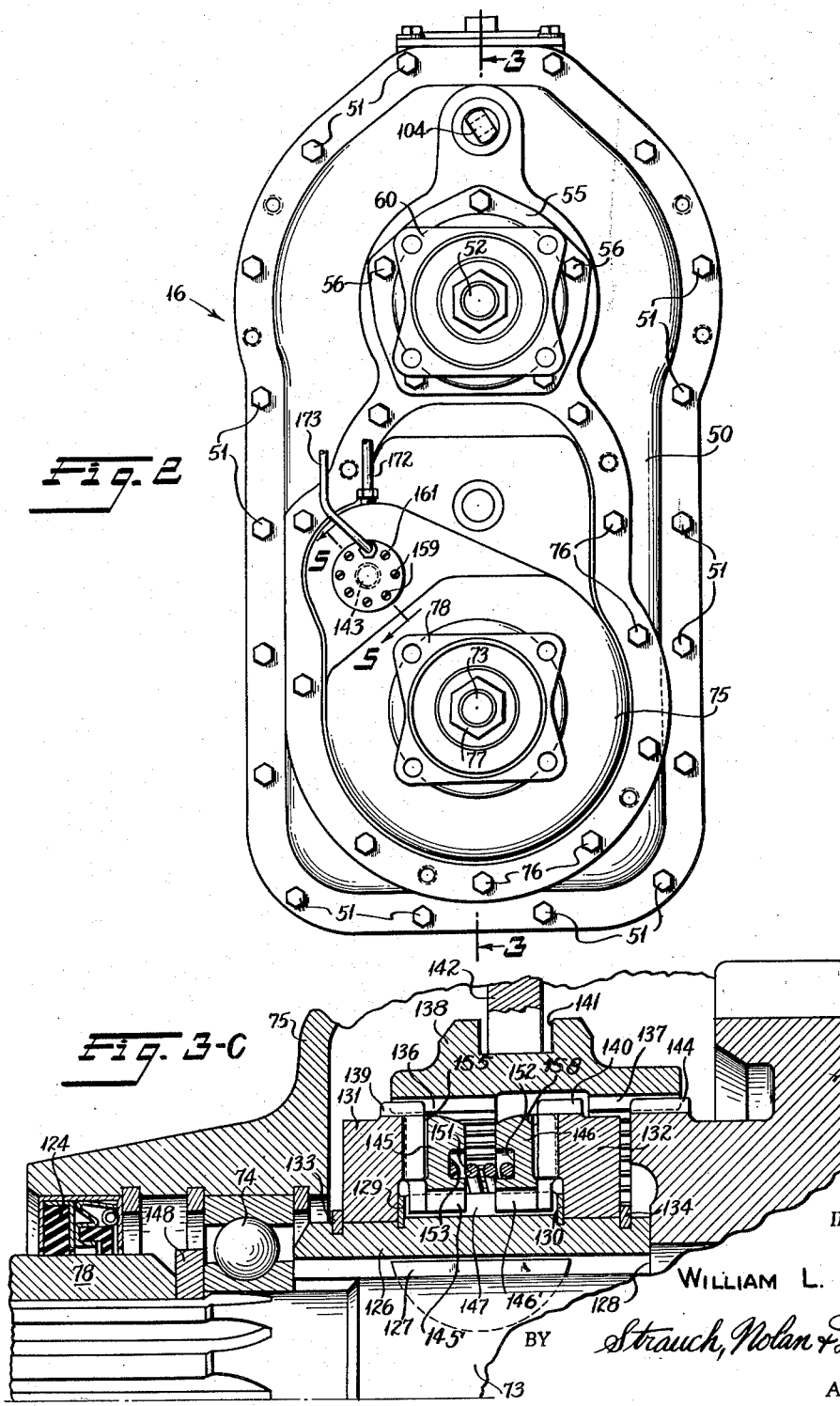
INVENTOR
WILLIAM L. PRINGLE
BY Strauch, Nolan & Diggins
ATTORNEYS United States Patent Office 2,802,554
Patented Aug. 13, 1957

2,802,554

VEHICLE DRIVE MECHANISM

William L. Pringle, Detroit, Mich., assignor to Rockwell Spring and Axle Company, Coraopolis, Pa., a corporation of Pennsylvania Application December 30, 1953, Serial No. 401,201

5 Claims. (Cl. 192—21)

This invention relates to improvements in multiple drive axle vehicles wherein al rear and front wheels may be driven, and more particularly relates to improvements in the transfer case and overrunning clutch mechanism for the front wheels. This application is a continuation-in-part of my copending application Serial No. 298,685, filed July 14, 1952, for Multiple Drive Axle Vehicle.

In accordance with a further feature of my invention I have provided a simplified and more rugged overrunning clutching mechanism peculiarly adapted for vehicle drive trains of this type employing dog type clutching teeth which is easily interchangeable with sprag type overrunning clutch mechanisms examples of which are disclosed in my prior application Serial No. 298,685.

My improved overrunnning clutch mechanism is also particularly adaptable, because of its simplicity and ruggedness, to be used as a braking mechanism as by having the front wheels impose a drag upon the counter shaft of the transfer case when rolling in the same direction as the rear wheels, to thereby set up an interference effect between the vehicle front and rear wheels, to brake the vehicle under conditions such as are encountered by a vehicle towing a heavy load when running down grade on steep slopes or the like.

It is therefore a further object of the present invention to provide a new and improved dog type clutching tooth drive of less complexity and of more rugged construction than a multiple member sprag clutch drive, and which may be easily substituted for the front drive overrunning clutch of the sprag type in a transfer case of a vehicle drive train.

These and other objects will become apparent by reference to the appended claims and as the description proceeds in connection with the accompanying drawings, wherein:

Figure 1 is a side elevation view illustrating in outline a vehicle drive train embodying my invention.

Figure 2 is a front end view in elevation of a preferred embodiment of the transfer case of the present invention.

Figure 3 is a sectional view through the transfer case, taken along a line 3—3 of Figure 2 passing through the input, counter and output shafts of the transfer case.

Figures 3A and 3B are supplementary views showing two other positions of the overrunning clutch control valve that is shown completely in Figure 2.

Figure 3C is an enlarged fragmentary section of the portion of Figure 3 illustrating details of the clutch structure.

Figure 4 is a partial view of the overrunning clutches in the transfer case, illustrating details of the dog clutch teeth.

Figure 5 is an enlarged fragmentary sectional view of the shift cylinder structure of Figure 3 as applied to the transfer case; and Figure 6 is a partial vertical sectional view of another embodiment of overrunning dog clutch assembly as shown in Figure 9 of my copending application Serial No. 298,685 filed July 14, 1952.

Referring to Figure 1 wherein the drive train for a multiple drive axle vehicle constituting the present invention is shown in outline, the drive train is shown to comprise a prime mover 10 such as an internal combustion engine mounted on a vehicle frame (not shown) over the front drive axle, an engine clutch assembly 12 for disengaging the prime mover from the rest of the drive train when desired, as when changing gears, a transmission unit 14, preferably of the change speed type including a reverse, a drive torque distributing transfer case 16 which is connected to the output of the transmission unit 14 by a propeller shaft 18, and including a forward rear axle drive unit 20 wherein the differential driven axle shafts are represented by 19. The axle drive unit 20 includes an axle housing 21 supported at its opposite ends by ground engaging wheels 22 and is provided with a carrier 24 supporting a differential gear drive mechanism, for example as shown in my copending application Serial No. 298,685, which is drive connected to the rear output shaft of the transfer case 16 by a universally connected propeller shaft 26. A rearward rear drive axle unit 28 having an axle housing 30 identical with housing 21, is supported at its ends by ground engaging wheels 32 differentially driven by axle shafts 29, and has mounted upon it a carrier 34 identical with the carrier 24 and which supports a differential drive mechanism similar to that in carrier 24 and housing 21, which is drive coupled by a universally connected propeller shaft 36 to the input shaft of the gear drive mechanism of carrier 24. A front drive axle 38 having an axle housing 40 and a carrier 44 supporting a differential gear mechanism is drive coupled to the front output shaft (not shown in Figure 1) of the transfer case 16 by a universally connected propeller shaft 46. The axle 38 is supported by wheels 42 that are differentially driven through axle shafts 41 by the front differential.

The details of the two speed transfer case structure constituting the first and preferred embodiment of the invention are shown in Figures 3 and 4 of the drawings. Referring to Figure 3 the transfer case 16 includes a central hollow cup shaped portion 48 having an integral rear wall 49 and a removable front wall 50, secured to the central portion 48 as by a series of bolts or cap screws 51.

The transfer case is provided with a power input shaft 52 journalled at its right end in a ball bearing assembly 53 and at its left end in a ball bearing assembly 54 retained by a cap 55 secured to the removable front wall 50 as by cap screws 56. Cap 55 also contains an annular oil seal 57. At its forward end the input shaft 52 has secured to it a flange member 60 of the rear end of a universal joint 61 (Figure 1) on the propeller shaft 18. An intermediate or counter shaft 62 is journalled in spaced parallel relation to input shaft 52 as by bearing assemblies 63 and 64 and a rear axle output shaft 65 is journalled in spaced parallel relation to the counter shaft 62 as by bearing assemblies 66 and 67. At its rear end the output shaft 65 has splined thereto and secured by a nut 68 or the like, a flange member 71 of a universal joint 72 (Figure 1) on the forward end of propeller shaft 26.

The forward end of rear axle output shaft 65 has a central recess 69 to receive the rear end 70 of a coaxial front power output shaft 73 that is journalled adjacent its forward end in a bearing assembly 74 carried by a cover or housing extension 75 that is secured to the transfer case front wall 50 as by cap screws 76. At its forward end, the front power output shaft 73 has splined thereto and secured by a nut 77, a flange member 78 of a universal joint 81 (Figure 1) on the rear end of propeller shaft 46.

A low ratio gear 82 is journalled for rotation on the power input shaft 52 and adjoining the bearing assembly 54, by a pair of bearing assemblies 83. Adjoining the rear bearing assembly 53 a high ratio gear 84 is journalled for rotation on the power input shaft 52 by a pair of bearing assemblies 85, the low ratio gear 82 is in constant meshing engagement with a low speed intermediate gear 86 secured to the counter shaft 62 by a key 87. The high ratio gear 84 is in constant meshing engagement with a high speed intermediate gear 91 secured to the counter shaft 62 by a key 92. The high speed intermediate gear is also in constant meshing engagement with a gear 93 keyed at 94 to the rear axle output shaft 65. All of these gears are preferably helical spur gears.

The speed of rotation of counter shaft 62 and of the rear axle output shaft 65 with respect to the power input shaft 52 is dependent upon whether the counter shaft 62 is driven by gears 82—86 or gears 84—91, as will be described.

Between gears 82 and 84 the power input shaft 52 is formed with an enlarged externally splined portion 95 against which the inner ends of ball bearing assemblies 83 and 85 abut. An internally splined clutch collar 96 is mounted for longitudinal sliding movement along the splined portion 95 of shaft 52. Collar 96 is provided at each end of its hub with exterior annular rows of clutch teeth 97 and 98 while gears 82 and 84 are each provided with an axially extending flange portion adjacent collar 96, providing annular rows of clutch teeth 99 and 100 which are adapted for mating driving engagement respectively with the clutch teeth 97 and 98 of the clutch collar 96 to drive counter shaft 62 either by the low ratio gear 82 or the high ratio gear 84.

The peripheral extremity of a central radially extending flange 102 of collar 96 is operatively connected to a shifting fork 103 which is fixed for longitudinal movement with an axially sliding shift rod 104 in the usual manner. Through the longitudinal movement of the shifting fork 103, collar 96 may be shifted to the left so that a drive connection is established between collar 96 and low ratio gear 82 through the engaged clutch teeth 97 and 99, or to the right to establish a drive connection between the collar 96 and the high ratio gear 84 through the engaged clutch teeth 98 and 100 to thus alternatively drive couple the power input shaft 52 to either the low ratio gear 82 or the high ratio gear 84.

The peripheries of the axially extending flange portions 106 and 107 of gears 82 and 84 are provided with external conical surfaces which coact with internal surfaces 108 and 109 (which may also be conical) on annular members 112 and 113 respectively, which are interconnected by a plurality of equiangularly spaced axially extending thrust pins 114, (only one of which is shown in Fig. 3) that in turn are connected through resilient detent assemblies 115 to the clutch collar 96. These mating conical surfaces coact as cone friction clutches, being adapted to be engaged by the longitudinal movement of clutch collar 96 prior to the engagement of the corresponding annular clutch teeth, thus providing a means for synchronizing the movement of the gears 82 or 84 with that of the clutch collar 96 prior to the establishment of a positive drive connection, to avoid clashing of the clutch teeth 97 or 98 with the clutch teeth 99 or 100. Thus the counter shaft 62 is driven at a lower speed when driven through gears 82—86 than when driven through gears 84—91, and the rear axle output shaft 65 is driven at either low speed or high speed from the counter shaft 62 by engagement of gears 91 and 93.

The foregoing disclosure describes how the rear axle output shaft 65 may be selectively driven at either of two different speeds corresponding to the given speed of the propeller shaft 18, the speed of which depends upon engine speed and the particular gear ratio of the change speed transmission 14. The mechanism by which the front wheels 42 are driven at a different speed than the rear wheels 22—32, whether the vehicle is driven forwards or backwards, will now be described.

The front power output shaft 73 is journalled at its rear end 70 in the axial recess 69 in the rear axle output shaft 65. An overrunning clutch drive gear 118 is journalled for free rotation upon the front power output shaft 73, being driven by a gear 119 suitably keyed or splined at 122 to the forward end of the counter shaft 62 and held thereon as by cap screws 123. Forward of the bearing 74 for the front power output shaft 73 is an oil seal 124, between the housing extension 75 and a hollow cylindrical portion of the flange member 78 where the flange member 78 is splined upon the forward end of the front power output shaft 73. The gear ratio between gears 119—118 is less than that between gears 91—93, so that for any speed of the counter shaft 62 the gear 118 will be driven at a slower speed than the gear 93 and the rear axle output shaft 65. A gear ratio such that the angular velocity of gear 118 is approximately 92.6% of the angular velocity of the rear axle output shaft 65 has been found to be quite satisfactory for general usage. A range of 90 to 95.5% or 95% of the angular velocity of gear 118 with respect to that of shaft 65 for vehicles ranging in size from ten to two and one-half tons, respectively, produces optimum results.

*Overrunning clutch drive for front wheels*

In order to drive the front power output shaft 73 in the direction of motion of the vehicle, and at a speed less than that of the sets of rear wheels 22 and 32 when the rear wheels lose their traction, or to disconnect them from the engine, the following is the preferred embodiment of my invention.

A collar or sleeve 126 is mounted upon shift 73 and keyed thereto by key 127. Axial movement of the sleeve 126 is prevented by a shoulder 128 on shaft 73 and the inner race of ball bearing assembly 74. A pair of clutch drums 131 and 132 are freely rotatable upon sleeve 126, and are restrained from axial movement in either direction by pairs of snap rings 133 and 134 and 129 and 130 seated in longitudinally spaced annular peripheral grooves in the sleeve 126. The outer peripheries of the clutch drums 131 and 132 are splined for driving engagement by longitudinally spaced sets of internal splines 136 and 137 on a clutch shift collar 138 that has a central outer peripheral groove 141 within which is received an axially movable shift fork 142 that is shifted axially by a shift rail 143.

The internal splines 137 on the clutch shift collar 138 are long enough so that irrespective of the axial position of the collar 138 they are in engagement with a set of external peripheral splines 144 on the left end of the overrunning clutch drive gear 118. The length of the internal splines 136 and 137 are such that when the clutch shift collar is in the leftmost position as viewed in Figure 3 the clutch drum 131 will be driven by engagement of splines 136 with external splines 139 and the clutch drum 132 splines are disengaged from the shift collar splines 137. When the shift collar 138 is shifted to the right to an intermediate or neutral position its splines 136 engage the splines of neither drum 131 nor 132. When the shift collar 138 is shifted to its rightmost position, its splines 136 engage the peripheral splines 140 on the other clutch drum 132. Thus by the shifting of the clutch collar 138, either the clutch drum 131 or the clutch drum 132 is driven in the same direction and speed as the overrunning clutch drive gear 118, which, as has been previously described, is driven at a lower speed than the gear 93 and the rear output shaft 65.

A pair of overrunning clutch members 145 and 146 are axially slidably mounted upon collar or sleeve 126 between the clutch drums 131 and 132. Each overrunning clutch member 145 and 146 is internally splined at 145' and 146' respectively for driving or driven engagement with external splines 147 on collar 126 between the snap rings 129 and 130, so that each overrunning clutch member 145 and 146 will always rotate at the same speed as the collar 126 and the front power output shaft 73 to which the collar 126 is keyed by the key 127. The collar 126 is retained against the shoulder 128 on the front power output shaft by the nut 77, flange member 78, ring 148 and the inner race of bearing assembly 74. The two overrunning clutch members 145 and 146 are resiliently urged in opposite axial directions, and into engagement with the clutch drums 131 and 132 by an axially extending coil spring 151 surrounding the collar 126 and received at its ends in oppositely facing annular grooves 152 and 153, in the overrunning clutch members 145 and 146.

Driving engagement in one direction between clutch drum 131 and member 145 is provided by dog clutch teeth in the following manner. Referring to Figure 4, clutch drum 131 has an annular series of dog clutch teeth 154 having axially extending straight tooth sides 155 on one side, the other sides of the teeth being beveled to provide inclined surfaces 156, all being inclined in the same direction, between each pair of adjacent teeth. The overrunning clutch member 145 has an equal number of dog clutch teeth 157 of the same configuration, and complementary to the teeth 154 on drum 131, so that there is a ratchet or slipping effect between the teeth of drum 131 and overrunning clutch member 145 when there is relative rotation therebetween in one direction, but a positive drive between the teeth on the two members in the other direction. For example, as viewed in Figure 4 if the teeth 154 on drum 131 are moving downwardly they will drive the teeth 157 on member 145 unless member 145 is rotating in the same direction at a greater speed, in which case the teeth will slip over each other with a ratchet effect.

The other cooperating clutch drum 132 and overrunning clutch member 146 are similar to the drum 131 and member 145 just described, except that the straight tooth sides 158 on the drum 132 face in the opposite direction from the straight tooth sides 155 on drum 131, so that drum 132 can drive member 146 in the opposite direction, as when the vehicle is in reverse gear.

Thus in normal operation, if the vehicle is being driven forward and the rear wheels 22 and 32 are not slipping upon the ground, the front wheels 42 are not driven since the rear axle output shaft is driven at a higher speed than the overrunning clutch drive gear 118 for the front power output shaft 73. In such case the front power output shaft 73 will be rotating faster than the clutch drive gear 118, and the teeth of the overruning clutch member 145 will overrun or ratchet over the teeth of the clutch drum 131 without driving them. If the rear wheels should lose traction and the vehicle slows down, then the front wheels will also slow down until there is a driving engagement between the teeth on clutch drum 131 and the teeth on the overrunning clutch member 145, whereupon the vehicle will be driven through the front wheels until traction is regained by the rear wheels.

In a similar manner, if the vehicle is being driven in reverse, and the shift fork 142 is shifted to engage internal splines 136 with external splines 140 to drive clutch drum 132, then the clutch member 146 will overrun the clutch drum 132 unless the rear wheels lose their traction, whereupon the front wheels will drive the vehicle in reverse.

In accordance with one of the objects of my invention, the overrunning clutch mechanism may be shifted to reverse when the vehicle is moving forward, or vice versa, to provide a braking interference effect between the front and rear wheels, as for down-hill emergencies or the like, as will now be described. Assuming that the vehicle is moving forward, with no slippage at the wheels, the shift fork 142 may be shifted, by means to be described, so that the splines 140 on drum 132 are engaged with splines 136 on the clutch shift collar 138. The overrunning clutch member 146 will be driven faster by the front wheels 42 than the clutch drum 132 is being driven by the overrunning clutch drive gear 118, thus the straight tooth sides of member 146 will engage the straight tooth sides 158 of clutch drum 132 with a positive restraining engagement. This limits front wheel rotation to a maximum which is a predetermined fraction less than the rear wheel rotation. The resulting interference or fight reaction will act through the gears of the overrunning clutch mechanism and of the transfer case 16 to cause a braking effect upon the vehicle motion.

The control and actuating means by which the shift rail 143 is shifted to forward, neutral, or reverse is preferably similar to one of the types illustrated in my copending application Serial No. 248,240 for Shift Control Mechanism, now Patent No. 2,754,695. For purposes of completeness herein a suitable control mechanism is illustrated schematically and will now be described. Referring to Figures 3 and 5 and to supplementary Figures 3A and 3B there is shown in Figure 4 a cylinder 161 mounted upon the housing extension 75 coaxially with the shift rail 143, as by cap screws 159, and which has a reciprocable piston 162 therein, the piston being secured upon the forward end of the shift rail 143 as by a nut 163. Springs 165 and 166 on opposite sides of the piston 162 urge the piston to a central position within the cylinder 161 when the fluid pressure on opposite sides of the piston is equal. Under such conditions the internal splines 136 on the clutch shift collar will not be engaged with either the external splines 139 or drum 131 or the external splines 140 on drum 132, and the overrunning clutch drive is in neutral. As shown in Figures 3 and 5 however, the piston 162 is at the forward end of its stroke due to air pressure admitted through air or fluid pressure line 167, passageway 168 in valve stem 169, and line 172 leading to the right hand end of the cylinder 161. At the same time, the left or forward end of cylinder 161 is connected to atmospheric pressure through line 173, passageway 174 in valve stem 169, and the line 175 that is open to the atmosphere. This is the normal condition when the vehicle is in forward motion, during which time there will be no driving torque applied to the front wheels 42 unless the rear wheels 22 and 32 slip so as to allow clutch drum 131 to drive the overrunning clutch member 145.

The movable valve control stem 169 in the fixed valve housing 176 may be rotated by any suitable manual or automatic mechanism under the control of the vehicle operation, and may be controlled by the same mechanism that shifts the transmission 14 to reverse the vehicle, so that the valve stem can be automatically shifted to the position shown in Figure 3B when the direction of motion of the vehicle is reversed by shifting the transmission 14 to reverse. However, since it is a feature of my invention that the overrunning clutch drive for the front wheels 42 may be shifted to reverse when the vehicle is being driven forward, and vice versa, the shifting of the valve control stem 169 is preferably controlled by the vehicle operator independently of the control of the transmission 14, as for example by having the valve housing 176 in the operator's compartment, with an operator controlled handle upon it. Suitable remote controls can be used if the valve housing 176 is remote from the operator's compartment.

When the valve stem 169 is in the position shown in Figure 3A it blocks the air or fluid pressure line 167, and both line 172 and 173 from the cylinder 161 are connected to a diametrical passageway 177 in the valve stem 169, which passageway 177 has a central passageway 178 open to atmosphere. Under such conditions the springs 165 and 166 will center the piston 162 in the cylinder 161 and the clutch shift collar will be in neutral position. When the valve stem 169 is in the position shown in Figure 3B the fluid pressure from line 167, valve stem passageway 174 and line 173 will force the piston to the right, as will be obvious, shifting the clutch shift collar 138 to reverse position.

Alternate overrunning clutch of Figure 6

In the embodiment illustrated in Figure 6 an overrunning clutch drive gear 181 is rotatably mounted upon the front power output shaft 73 and has forwardly extending splines 182 that are in continuous driving engagement with internal splines 183 on a clutch shift collar 184. A collar or sleeve 185 is mounted on shaft 73, being clamped against shoulder 128 in the same manner as the collar or sleeve 126 of Figure 3, and secured against rotation by a key 186. The sleeve 185 has an internal central clutch ring 187 extending radially outwardly and between a pair of clutch drums 188 and 189 which have peripheral splines 190 and 191 that are selectively engaged by internal splines 192 on the clutch shift collar 184.

The opposing radial faces of clutch drum 188 and of the clutch ring 187 are provided with dog clutch teeth similar to those illustrated in Figure 4, and similarly having driving engagement in one direction and an overrunning or slipping engagement when there is relative movement therebetween in the other direction. Similarly, the opposing radial faces of the clutch ring 187 and the clutch drum 189 are provided with dog clutch teeth, which provide a driving and an overrunning engagement, but in the opposite direction from the forward dog clutch teeth previously described on the forward side of the clutch ring 187. The clutch drums 188 and 189 are resiliently urged into continuous driving or overrunning engagement with the clutch ring 187 by means of a pair of compression coil springs 193 and 194 that surround the sleeve 185 and are retained thereon by spring seats 196 and 197 and by snap rings 198 and 199. Movement of the clutch shift collar 184 to forward, neutral, or reverse positions is by the shift fork 142 engaged within a peripheral groove 200 on the clutch shift collar 184. The shift fork 142 is mounted upon shift rail 143 which may be identical to and controlled in the same manner as the shift rail 143 of Figure 3.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination in a vehicle drive mechanism, a rotatable shaft, a drive gear freely rotatable about said shaft, two spaced clutch members freely rotatable about said shaft, clutch means non-rotatably mounted on said shaft, oppositely directed dog type jaw clutch teeth on opposite sides of said clutch means, dog type jaw clutch teeth on the side of one of said clutch members adapted for torque transmitting engagement in one direction of rotation only with the clutch teeth on one side of said clutch means, dog type jaw clutch teeth on the side of the other of said clutch members adapted for torque transmitting engagement in only the other direction of rotation with the clutch teeth on the other side of said clutch means, and a shiftable clutch element movable to positively drive connect one or the other of said clutch members to said gear.

2. In combination in a vehicle drive mechanism, a rotatable shaft, a drive gear rotatably mounted on said shaft, spaced clutch members rotatably mounted on said shaft, clutch means non-rotatably mounted on said shaft, dog type jaw clutch teeth on opposite sides of said clutch means having substantially straight sides facing opposite directions and inclined sides between said straight sides, dog type jaw clutch teeth on the side of one of said clutch members having straight sides for engaging the straight tooth sides at one side of said clutch means in one direction of rotation and inclined sides between its straight sides, dog type jaw clutch teeth on the side of the other of said clutch members having straight sides for engaging the straight tooth sides at the other side of said clutch means in opposite direction of rotation and inclined sides between its straight sides, all said inclined tooth sides being inclined in the same direction relative to the axis of said shaft, resilient means urging said clutch members and said clutch means axially toward each other so that when one of said members is rotated with its straight tooth sides engaged with the corresponding straight tooth sides of said clutch means the inclined tooth sides at the other side of said clutch means ratchet over each other in non-torque transmitting relation, and means positively drive connecting said gear to one or the other of said clutch members.

3. In the combination defined in claim 2, said clutch means comprising spaced clutch rings non-rotatably but axially slidably mounted on the shaft between said clutch members, each ring carrying the teeth of one side of said clutch means, and means fixing said clutch members against axial displacement relative to said shaft, and said resilient means being compression spring means disposed between said rings.

4. In the combination defined in claim 2, said clutch means being rigid with said shaft, said clutch members being rotatably and axially slidably mounted on said shaft on opposite sides of said clutch means, and said resilient means comprising springs backing each of said clutch members.

5. In combination in a vehicle drive mechanism, a shaft, a gear freely rotatable about said shaft, two spaced clutch drums freely rotatably mounted upon said shaft and fixed against axial displacement with respect to said shaft, peripheral clutch teeth on said drums and an aligned set of clutch teeth on said gear, a clutch collar slidable upon said clutch teeth and adapted to interconnect the gear positively to rotate one or the other of said clutch drums, clutch rings slidably and non-rotatably mounted on said shaft between said drums, a compression spring between said clutch rings urging them toward said clutch drums, and oppositely unidirectional jaw clutch teeth between the clutch ring and associated clutch drum pairs.

References Cited in the file of this patent

UNITED STATES PATENTS

| | | |
|---|---|---|
| 2,107,072 | Herrington | Feb. 1, 1938 |
| 2,154,045 | Herrington | Apr. 11, 1939 |
| 2,354,300 | Bock | July 25, 1944 |
| 2,601,297 | Keese | June 24, 1952 |
| 2,711,222 | Bock | June 21, 1955 |

FOREIGN PATENTS

| | | |
|---|---|---|
| 507,965 | Belgium | Jan. 15, 1952 |

OTHER REFERENCES

Publication: "Unusual Features of Army Transfer Case," appearing in "Automotive Industries," Sept. 1, 1950, pages 32, 33, 72.